United States Patent Office 2,975,088
Patented Mar. 14, 1961

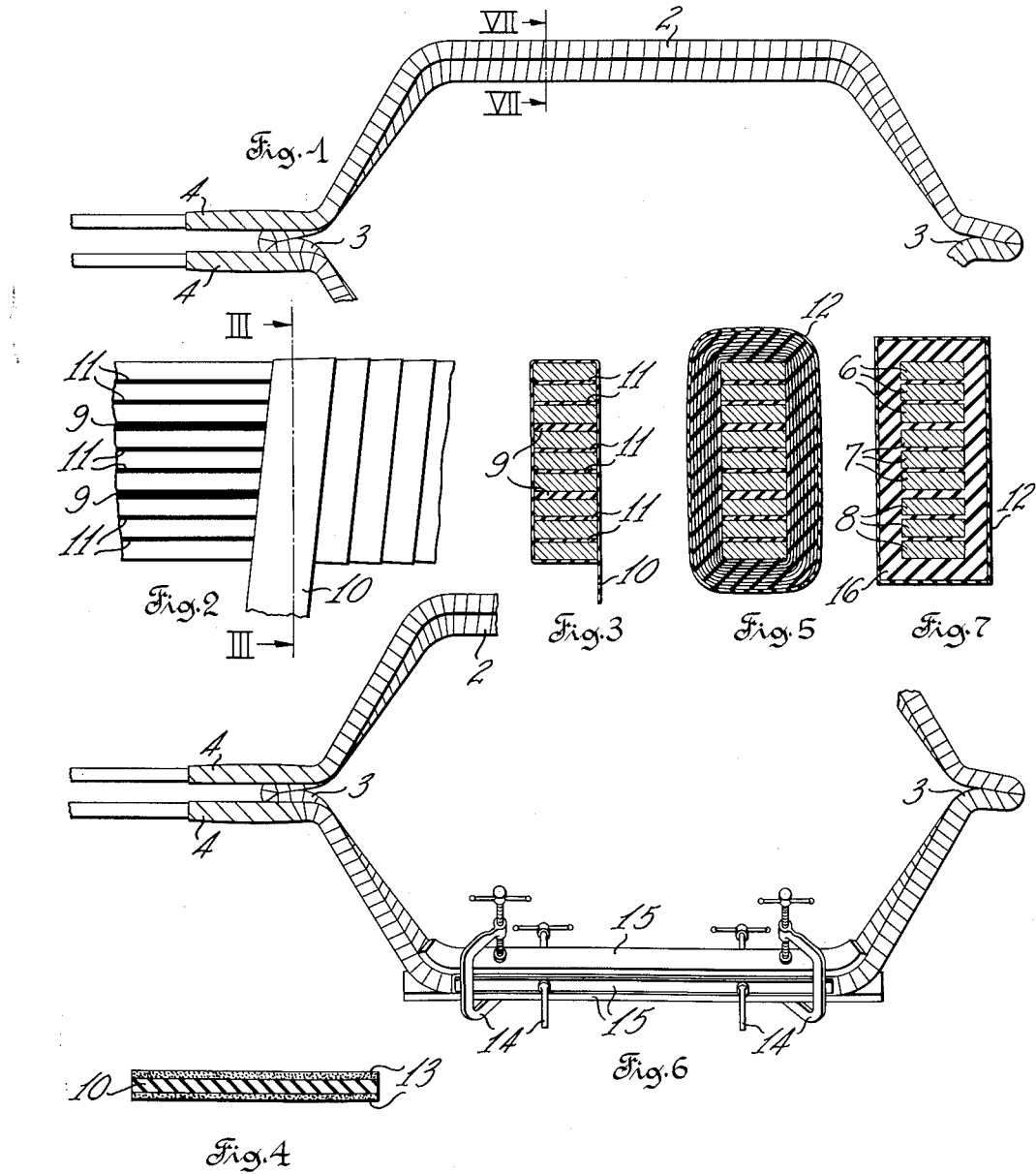

2,975,088

UNSUPPORTED SILICONE RUBBER ELECTRICAL INSULATION AND METHOD OF PREPARING SAME

Earl C. Rossman, Wauwatosa, and Russell C. Frank, Waukesha, Wis., assignors to Allis-Chalmers Manufacturing Company, Milwaukee, Wis.

Filed Feb. 29, 1956, Ser. No. 568,453

13 Claims. (Cl. 154—2.26)

This invention relates generally to insulation for and the insulation of electrical conductors. More particularly, this invention is concerned with rendering a silicone elastomer, commonly referred to as silicone rubber, more suitable for insulating electrical conductors and also to the methods of more effectively utilizing such material for conductor insulation.

The materials and methods heretofore employed in insulating electrical conductors, have been considered reasonably satisfactory. However, there is room for improvement especially in machines subjected to high temperature operating conditions for long periods of time and to unfavorable conditions, such as chemical, abrasive, corrosive and moist atmospheres. In general, the prior insulation of electrical conductors embodied a combination of coating and wrapping with suitable resinous binding material which in many cases deteriorated when subjected to high temperatures for a considerable period of time with the result that the insulation cracked or otherwise failed dielectrically.

In order to overcome these difficulties, the use of silicone rubber was proposed, but the only practical application thus far developed has been to use what is commonly termed "supported" silicone rubber tape or sheet material. This tape or sheet material is formed by applying and vulcanizing a silicone rubber compound to one or both sides of glass fiber, cloth or tape. In addition to increasing the cost of the material, the use of a silicone rubber covered supporting media resulted in a nonhomogeneous material having poor conformability, poor moldability and but little elasticity. As a result, considerable difficulty was experienced in obtaining a satisfactory insulation, particularly of irregular shaped conductors.

Applicants initially considered using unsupported silicone rubber tape or sheet material as an insulating covering for electrical conductors as this material has suitable elasticity thus enabling it to be applied under considerable stretch and tension, which results in the tape more readily conforming to the irregularities of the conductor. Moreover, if the unsupported silicone rubber material was coated with a suitable silicone rubber paste, the applicants recognized that any voids resulting from conductor irregularity and the wrapping operation could be more effectively filled and eliminated. However, extensive experimentation established that while such unsupported insulation could be readily applied to produce an insulating covering which is quite homogeneous and far superior in dielectric qualities to that produced by using other known materials and methods, it failed upon being subjected to high temperature conditions. Further, it was soon found that this failure resulted from cracks in the insulation which, of course, made it impractical for use as an electrical insulating material in apparatus wherein the material would be subjected to high temperatures and voltages.

Applicants finally discovered that the cracking defect previously mentioned could be entirely eliminated if unsupported silicone rubber material were subjected to a preapplication heat cure for a time and at a temperature such that the material would possess certain physical characteristics not heretofore recognized. Further, it was found that this material will withstand high temperatures after it is stretch wrapped about a conductor. However, best results are obtained if an uncured silicone rubber paste is employed in connection with the stretch wrapping operation and the thus covered conductor is heated to set the uncured paste.

Accordingly, this invention is directed toward and has as an object the provision of an unsupported silicone rubber material having physical characteristics rendering it usable and particularly as satisfactory insulation for the conductors of electrical apparatus.

This invention is also concerned with and has as an object the provision of a practical method of effectively insulating an electrical conductor with unsupported silicone rubber material.

This invention is further concerned with and directed toward the provision of still another practical method of insulating an electrical conductor with unsupported silicone rubber material in a manner insuring the elimination of voids and the obtainment of a homogeneous covering insulation.

The manner of achieving these and other objects and the importance of this invention will become readily apparent from reading the following detailed description, reference being had to the accompanying drawings, wherein:

Fig. 1 is a plan view of a portion of a finished coil of an electric machine embodying the invention;

Fig. 2 is a side elevation of a portion of a stator coil to which tape insulation is being applied in accordance with this invention;

Fig. 3 is a cross section through the coil portion shown in Fig. 2, the section being taken on line III—III of Fig. 2;

Fig. 4 is a cross section through an enlarged piece of tape embodying the invention, the tape being shown as coated with an uncured silicone rubber paste on both sides;

Fig. 5 is a cross section through one side of a coil which has been wrapped with successive layers of insulation in the manner indicated in Fig. 2;

Fig. 6 illustrates the manner in which the insulation covering a stator coil may be compacted in accordance with common practice; and Fig. 7 is a cross section through a finished coil, the section being taken on line VII—VII of Fig. 1.

Referring to Fig. 1 of the drawing, the insulated conductor shown for purposes of illustration is a stator coil for a rotating electrical machine. Such a coil is generally of diamond shape and comprises straight side portions 2 and similarly shaped opposite end portions 3 terminating at one end in lead parts 4. This coil, as more clearly shown in cross section in Fig. 7, consists of three turns with each turn containing three strands. The strands in the first turn are designated 6, the strands in the second turn are designated 7, and the strands in the third turn are designated 8.

Referring now to Figs. 2 and 3, the turns are insulated from each other by silicone rubber, or other suitable material, designated 9, and the strands in each turn are similarly insulated from each other, the insulation between strands being designated 11. In this instance, more insulation is applied between turns than is applied between strands. More specifically, the strands may be collectively stretch wrapped with tape or sheet material having the characteristics forming a part of this invention, or the turns may be insulated from each other by employing separators of the same material. In either case, this material may be an unsupported silicone rubber tape or sheet which has been subjected to a controlled pre-application heat cure for a time and at a temperature such that it has the following three physical characteristics: (1) similarly cured and tack-free external surfaces; (2) the stress strain curve of the material at room temperature persists at elevated temperatures with an upward slope from strain equals zero to strain equals 100 percent; and (3) the material will not rupture if stretched 100 percent at room temperature and heated to 200° C.

Any of the known silicone compounds which are available in a condition suitable for extruding or otherwise forming the compound into tape or sheet form will be satisfactory providing (1) the compound is capable of being converted to a rubber by heat curing, and (2) if after the extruding or otherwise forming operation is completed, the formed material is subjected to a controlled pre-application heat cure affording the aforementioned three physical characteristics. It is immaterial whether the compound must be preworked before the forming operation is effected and whether the pre-application heat cure is effected after or during the forming operation.

Application of the insulation to the coil, shown in Figs. 2 and 3, is completed by covering the coil with unsupported silicone rubber material having the aforementioned physical characteristics. The usual procedure is to apply the material in sheet form or tape 10 under considerable stretch, but not exceeding 100 percent stretch, in order to conform the insulating material to the shape of the coil and to those irregularities which may be produced in the wrapping operation. Also, the stretch wrapping initially eliminates many of the voids which would likely result if but little or no tension were applied in the wrapping operation. If desired, the tape may be coated on one or both sides (note Fig. 4) with uncured silicone rubber paste 13. If paste is applied either to one or both sides of the insulating material, stretch wrapping more effectively eliminates voids, and especially those produced by conductor irregularity.

When the coil is covered with this insulation to the desired thickness, a protective wrapping 12 is usually applied, as indicated in Fig. 5. The use of a protective wrapping is usually desirable since the protective material provides a tough outer covering and serves to prevent extrusion of insulation between the clamps or other media used in the subsequent compacting operation. The protective wrapping material may be of any suitable type such, for example, as a glass or other tough fabric which may be coated or impregnated with varnish, silicone rubber or other suitable coating. It should be noticed that in the coil construction shown in Fig. 5, the desired thickness was obtained by applying successive layers of the tape or sheet material.

Next, the insulation surrounding the coil is compacted by any known method, such as by the use of suitable clamps 14 and molding strips 15, as indicated in Fig. 6. This procedure is conventional and well known and one specific way for accomplishing this is set forth in U.S. patent, J. C. Botts et al., 2,601,243, June 24, 1952. When the insulation has been compacted, it is subjected to a brief heat cure which may be effected by passing an electric current through the coil, or by baking in an oven. However, any suitable heating step may be employed, as this treatment merely consists in raising the temperature of the insulation sufficient to set the paste employed. The time and temperature of this heat cure will vary somewhat due to coil size and the particular silicone compound employed as paste. The temperature for purposes of illustration usually ranges somewhere between 100° and 175° C. However, about 125° C. has been found satisfactory in most instances. In setting this paste, the paste may be said to effectively be vulcanized to the tape 10 thereby creating a homogeneous substantially solid wall of insulation, referred to by character reference 16 in Fig. 7. Nevertheless, this treatment may be omitted if no paste is employed.

The compacting and heat treating step just described operates: (1) to mold the coil insulation to the desired dimensions; (2) to further compact any irregular portions by causing the paste to flow and thoroughly fill any voids; and (3) to vulcanize the paste sufficiently to form a void-free homogeneous insulating wall.

Following this, the insulated coil is then subjected to a prolonged heat cure, the compacting media being first removed from the insulated coil. This heat cure usually is run for 24 hours at a temperature of at least 200° C. The purpose of this heat cure is: (1) to obtain optimum physical properties; and (2) to prevent any reversion of the silicone rubber material to a depolymerized state.

Summarizing, there are certain essentials for the successful use of unsupported silicone rubber material as an insulation for the conductors of electrical apparatus. These essentials are: (1) that the unsupported silicone rubber wrapping or covering material is subjected to a pre-application heat cure such that it has the following physical characteristics: (a) similarly cured and tack-free external surfaces, (b) the stress strain curve of the material at room temperature persists at elevated temperatures with an upward slope from strain equals zero to strain equals 100 percent, and (c) the material will not rupture if stretched 100 percent at room temperature and heated to 200° C.; and (2) stretch wrapping the material around the conductor with the tape stretched an amount not exceeding 100 percent during the wrapping operation.

In addition when uncured paste is used, then a heating and compacting step and/or a heat cure step may be desired. Therefore, while the step of heating and compacting and the heat cure step will insure obtaining satisfactory results in every case, it is possible that one or both of these steps may be eliminated in certain applications with a consequent reduction in cost. Consequently, it is neither necessary nor desired that the claimed invention be limited to the inclusion of one or both of these two last mentioned steps in view of the presently known state of the art.

As previously indicated, when uncured silicone rubber paste is used with tension wrapped unsupported silicone rubber material, it is desirable that the silicone rubber compounds used to produce the paste and wrapping materials have similar properties. Also, while all silicone rubber compounds which have been subjected to a controlled pre-application heat cure to effect the aforementioned three physical characteristics, have been found satisfactory, it must be borne in mind that the extent of the heat cure may vary depending upon the composition of the compound selected. Further, while one compound may be thus cured by subjecting it to a temperature of say 350° C. for about 30 seconds, it will be appreciated that the same result may be obtained by lowering the temperature and increasing the time of cure. However, from the standpoint of cost, it is usually preferable to increase the temperature and shorten the time as much as possible so long as the cure can effectively be controlled to consistently produce a wrapping material having the three specified essential physical characteristics.

Suitable silicone rubber compounds are readily available as commercial products and may be readily formed into sheets or tape as desired, and once the extent of precure necessary to obtain the essential physical characteristics is determined, it is possible to purchase the material thus cured in a sheet or tape form ready for use.

For example, a silicone rubber compound consisting essentially of the following components: siloxane component, dimethylpolysiloxane gum, viscosity about 10,000,000 centistokes, 100 parts; filler component, fume silica 65 parts, and ferric oxide, 1¾ parts; accelerator component, benzoyl peroxide, 1 part. Viscosity of compound, about 30,000,000 centistokes. These components are compounded as is well known in the art, and this compound is available on the market.

This compound was milled to a soft puttylike consistency, was extruded in ribbon form (10 mils thick) of various widths. The ribbon was then subjected to a controlled pre-application heat cure effected by passing it through an air oven at 350° C., the heat cure lasting for 30 seconds. This controlled pre-application cure produced a product having the essential physical characteristic specified above.

The resulting tape was then lightly coated on both sides with a paste compound consisting essentially of the following components: siloxane component, fluid dimethylpolysiloxane, viscosity about 35,000 centistokes, 100 parts; filler component, calcium carbonate, 64 parts, and ferric oxide 6.4 parts; accelerator component, dichlorobenzoyl peroxide, 2 parts. Viscosity of compound, about 350,000 centistokes.

The conductors, with strand insulation and turn insulation in place, were then shaped in conventional "diamond" form, and the coated tape was applied stretched, the stretch being from 10 percent to 50 percent on the straight portions, and from 10 percent to 100 percent on the end portions.

The insulation was then covered with a commercially obtainable protective tape, and it was subjected to a compacting and brief low temperature heat treatment at 125° C. After removal of the compacting media, it was then subjected to a 24 hour oven bake at 200° C.

The choice of the siloxane component for the silicone elastomers, herein referred to as silicone rubber, should be limited to such organopolysiloxanes as have an average ratio of from 1.9 to 2.0 organic radicals per silicon atom, at least 50 mol percent of the siloxane units being dimethylsiloxane units, the remainder of the units being of the formula RR'SiO, where R and R' are selected from the group consisting of lower aliphatic hydrocarbon radicals (i.e., those having four or less carbon atoms) and phenyl radicals.

Although some of the radicals within the scope of this definition will attain the benefits of this present invention more fully than others, yet the benefits of this present invention may be obtained to a substantial degree by the use of any of them, and to that extent they may be considered as equivalents, if heat cured to possess the physical characteristics herein prescribed.

Typical species of the R and R' radicals are: methyl, ethyl, vinyl, allyl, n-propyl, isopropyl, n-butyl, secondary butyl, isobutyl, tertiary butyl and phenyl. Methyl, phenyl and vinyl are preferred, in that order.

The siloxane component may contain organic radicals of only one kind or of several kinds. In fact it may even be a copolymer in which there are two or more types of diorganosiloxane units. Such a copolymer may also contain small amounts of mono-organosiloxane units and triorganosiloxane units. In any event, the proportion of the various sorts of units should be such that there are on the average 1.9 to 2.0 organic radicals per silicon atom.

The siloxane component of the silicone compound which is to be used as starting material for the tape of the present process should have a viscosity of more than 1,000,000 centistokes.

The siloxane component of the silicone compound which is to be used as the paste of the present process should have a viscosity of from 2,000 to 500,000 centistokes.

The invention is not dependent on choice of filler. Accordingly, in general, any inorganic finely divided material, which will not react with either the siloxane component or the accelerator component, can be employed, provided it has melting, sublimation and decomposition points well above the temperature to which the insulation will be subjected either during heat treatment or in use.

Among the fillers which can be used are: silica, in such form as fume silica, aerogel, or diatomaceous earth; ferric oxide, calcium carbonate, titanium dioxide, etc. Fume silica is preferred because of its dielectric properties.

A combination of two or more fillers could be used.

A wide range of proportion of fillers to siloxane component can be employed, depending largely on which filler is chosen, and to some extent on the particle size. This range is roughly from 10 to 300 parts by weight of filter per 100 parts of siloxane. For example, a proper ratio for titanium dioxide would be of the order of 200 parts; and of fume silica, of the order of 70 parts.

As is well known in the art an accelerator component is utilized in compounding silicone rubber. The function of the accelerator is to bring about speedy curing or polymerization upon the application of heat. The result of this function is loosely referred to as vulcanization.

Appropriate accelerators include:

Organic peroxides such as: benzoyl peroxide; tertiary butyl perbenzoate; and tertiary butyl peracetate.

Halogenated benzoyl peroxides such as: dichloro benzoyl peroxide.

And, but for use only with siloxanes having unsaturated groups, sulphur accelerators: i.e., any such commonly used with organic rubber.

The proportion of accelerator to siloxane may range from about 0.5 to 10 parts of accelerator per 100 parts of siloxane, and is largely a matter of choice, depending on the siloxane, the accelerator, the apparatus employed, and the importance of the time element. This can best be determined in practice. In general, too little accelerator will prolong the vulcanization time, and too much will cause the compound to foam.

The term silicone rubber is used herein to include the compounded materials covered by the aforementioned.

Applicants point out the following in connection with their improved results. Insulation formed of unsupported silicone rubber tape heat cured in excess of that giving the herein essential physical characteristics, breaks when stretch wrapped and then heated. Such failure is due to the following reasons. Silicone rubber tape with any given degree of heat cure has a corresponding ultimate elongation at any given temperature, and that ultimate elongation decreases with (increasing) temperature. When the given temperature is reached for a corresponding ultimate elongation, the tape will break. However, the less the degree of cure, the greater the ultimate elongation at any given temperature, and the greater the amount of relaxation when subsequently heated. Therefore, a stretch wrapped unsupported silicone rubber tape will not break when later heated, if the applied elongation is less than the ultimate elongation at the heating temperature. Further while subsequent heating will further cure the tape, breaking will still not occur even when full cure is reached when the pre-application heat cure is limited as herein taught because the specified limited heat cure results in a relatively great amount of relaxation when the stretched tape is heated.

Accordingly, it is desired to limit the invention as disclosed and claimed herein, only to the extent as may be necessary to fairly distinguish it in patentable respects from the prior art.

It is claimed and desired to secure by Letters Patent:

1. The method of insulating an electric conductor, which method comprises: providing an unsupported tape of silicone rubber which has been subjected to a controlled preapplication curing that has progressed until the tape has the following two characteristics: (1) similarly cured external surfaces and (2) a stress strain curve of the tape at room temperature, persists at elevated temperatures with an upward slope from strain equals zero to strain equals 100 percent, but said tape has not yet progressed until the tape has acquired a characteristic (3) that the tape will rupture if stretched 100 percent at room temperature and heated to at least 200° C., said tape being coated on at least one side with uncured silicone rubber; then before any additional curing is applied, wrapping said coated tape under tension around said conductor; and then subjecting said tape to a final cure prolonged at least until said final cure progresses to the point at which said tape unwrapped acquires said characteristic (3).

2. The method of insulating an electrical conductor, which method comprises: providing an unsupported tape of silicone rubber which has been subjected to a preapplication cure that has progressed until the tape has the following two characteristics: (1) similarly cured external surfaces and (2) a stress strain curve of the tape at room temperatures, persists at elevated temperatures with an upward slope from strain equals zero to strain equals 100 percent, but said cure has not progressed until the tape has acquired a characteristic (3) that the tape will rupture if stretched 100 percent at room temperature and heated at least to about 200° C.; and then before curing is applied to advance the tape from the state of said characteristics (1) and (2) to the state in which the tape acquires characteristic (3), coating at least one side of said tape with uncured silicone rubber paste; wrapping said paste coated tape under tension around an electrical conductor; raising the temperature of the said tape and paste surrounding said conductor to give a preliminary cure to said paste, said preliminary cure of said paste being continued at least until said paste has bonded together with said tape; and then subjecting the paste coated tape wrapper around said conductor to a final cure prolonged at least until said cure progresses to the point at which said tape unwrapped acquires said characteristic (3).

3. The method of insulating an electrical conductor, which method comprises the following steps: (1) the step of forming an unsupported silicone rubber tape of silicone rubber; (2) the step of preapplication curing said tape until the tape has the following two characteristics: (a) similarly cured external surfaces and (b) a stress strain curve of the tape at room temperature, persists at elevated temperatures with an upward slope from strain equals zero to strain equals 100 percent, but said cure has not yet progressed until the tape has acquired a characteristic (c) that the tape will rupture if stretched 100 percent at room temperature and heated at least to about 200° C.; (3) the step of coating this tape on at least one side with uncured silicone rubber paste; (4) the step of wrapping the tape in this condition in successive layers around the conductor, under tension; (5) the step of compacting the thus applied insulation under the influence of heat and pressure to give a preliminary cure to said paste, said preliminary cure of said paste being continued at least until said paste has bonded together with said tape but not until said tape unwrapped would have acquired characteristic (c); (6) followed by the step of subjecting the paste coated tape to a final cure prolonged at least until said cure progresses to the point at which said tape unwrapped acquires said characteristic (c).

4. Method of insulating an electrical conductor, which method comprises: forming an unsupported tape of uncured silicone rubber; subjecting the thus formed tape to a preapplication cure until the tape has the following three characteristics: (1) similarly cured external surfaces, (2) will stretch 100 percent, and (3) a stress strain curve of the tape at room temperature, persists at elevated temperatures at an upward slope from strain equals zero to strain equals 100 percent, but said cure has not yet progressed until the tape has acquired a characteristic (4) that the tape will rupture if stretched 100 percent at room temperature and heated to at least about 200° C.; coating the thus partially cured tape on at least one side with uncured silicone rubber paste; and then before curing is applied to advance the tape from the state of said characteristics (1), (2) and (3), to the state in which the tape acquires characteristic (4) wrapping the thus coated tape around the electrical conductor, with the tape under tension and stretched up to about 100 percent during the wrapping operation; and then subjecting the paste coated tape wrapped around said conductor to a final cure prolonged at least until said cure progresses to the point at which said tape unwrapped acquires said characteristic (3).

5. The method of insulating an electrical conductor, which method comprises: forming an unsupported silicone rubber tape from raw silicone rubber; then subjecting the thus formed tape to a preapplication cure that has progressed until the tape has the following characteristics: (1) similarly cured external surfaces, (2) will stretch 100 percent and (3) the stress strain curve of the tape at room temperature, persists at elevated temperatures with an upward slope from strain equals zero to strain equals 100 percent, but said cure has not yet progressed until the tape has acquired a characteristic (4) that the tape will rupture if stretched 100 percent at room temperature and heated to at least 200° C.; then before curing is applied to advance the tape from the state of said characteristic (4), wrapping the conductor with successive layers of the thus partially cured tape, the tape being applied stretched under tension up to about 100 percent; then compacting the thus applied insulation, under the influence of heat and pressure and maintaining said heat and pressure until said layers of tape become bonded; and finally subjecting the tape wrapped around said conductor to a final cure prolonged to at least until said cure progresses to the point at which said tape unwrapped acquires said characteristic (4).

6. The method of insulating an electrical conductor, which method comprises: forming an unsupported silicone rubber tape from raw silicone rubber; then subjecting the thus formed tape to a preapplication cure until the tape has the following three characteristics: (1) similarly cured external surfaces, (2) will stretch 100 percent and (3) a stress strain curve of the tape at room temperautre, persists at elevated temperatures with an upward slope from strain equals zero to strain equals 100 percent, but said cure has not yet progressed until the tape has acquired a characteristic (4) that the tape will rupture if stretched 100 percent at room temperature and heated to at least about 200° C.; then coating the thus cured tape on at least one side with uncured silicone rubber paste; and then before curing is applied to advance the tape from the state of said characteristics (1), (2) and (3) to the state in which the tape acquires characteristic (4), wrapping the conductor with successive layers of the thus coated tape, the tape being applied stretched under tension up to about 100 percent, compacting the thus applied insulation, raising the temperature of the insulation to slightly more than the critical vulcanization temperature of the paste, and maintaining that temperature at that level until the insulation has been heated throughout to that temperature; and finally subjecting the tape wrapped around said conductor to a final cure prolonged at least until said cure progresses to the point at which said tape unwrapped acquires said characteristic (3).

7. The method of applying insulation to an electrical conductor, which method comprises: providing an unsupported tape of compounded elastomeric organopolysiloxane having from 1.9 to 2.0 organic radicals per silicon atom, at least 50 mol percent of the siloxane units being dimethylsiloxane units, the remainder of the units being of the formula RR'SiO, where R and R' are selected from the group of lower aliphatic hydrocarbon radicals and phenol radicals, the tape having been subjected to a preapplication cure until the tape has the following two physical characteristics: (1) the external surfaces are similarly cured and (2) the stress strain curve of the tape at room temperature will persist at elevated temperatures with an upward slope from strain equals zero to strain equals 100 percent, but said cure has not yet progressed until the tape has acquired a characteristic (3) that the tape will rupture if stretched 100 percent at room temperature and heated to at least about 200° C.; and then before curing is applied to advance the tape from the state of said characteristics (1) and (2) to the state in which the tape acquires characteristic (3), wrapping the conductor with successive layers of said tape under tension; and then subjecting the tape wrapped around the conductor to a final cure prolonged until said cure progresses to the point at which said tape unwrapped acquires said characteristic (3).

8. An insulating material for wrapping electrical conductors, said material comprising: an unsupported tape of silicone rubber which has been subjected to a preapplication cure that has progressed until the tape has the following two physical characteristics: (1) similarly cured external surfaces and (2) a stress strain curve of the tape at room temperatures, persists at elevated temperatures with an upward slope from strain equals zero to strain equals 100 percent, but said cure has not yet progressed until the tape will rupture if stretched 100 percent at room temperature and heated to 200° C.

9. An insulating material for wrapping electrical conductors, said material comprising: an unsupported tape of compounded elastomeric organopolysiloxane which has been subjected to a preapplication cure that has progressed until the tape has the following two physical characteristics: (1) similarly cured external surfaces, (2) a stress strain curve of the tape at room temperatures, persists at elevated tempertaures with an upward slope from strain equals zero to strain equals 100 percent, but which said cure has not progressed until the tape will rupture if stretched 100 percent at room temperature and heated to 200° C., said compounded elastomeric organopolysiloxane having from 1.9 to 2.0 organic radicals per silicon atom, at least 50 mol percent of the units being dimethylsiloxane units being of the formula RR'SiO, where R and R' are selected from the group consisting of the lower aliphatic hydrocarbon radicals and phenol radicals.

10. An insulated coil for electric motors and generators, and the like comprising: the conductor; an unsupported silicone rubber tape of silicone rubber which has been subjected to a preapplication cure that has progressed until the tape has the following two characteristics: (1) similarly cured external surfaces and (2) the stress strain curve of the tape at room temperature, persists at elevated temperatures with an upward slope from strain equals zero to strain equals 100 percent, but said cure has not progressed until the tape has acquired a characteristic (3) that the tape will rupture if stretched 100 percent at room temperature and heated to at least about 200° C., said tape being tension wrapped in layers around the conductor; the tape having been fully cured after wrapping to the point at which said tape unwrapped acquires a characteristic (3), to constitute a homogeneous void-free ground wall insulation.

11. An insulated coil for electric motors and generators and the like, comprising: the conductor; and, surrounding the conductor, a homogeneous void-free ground wall insulation, said insulation being built up of successive layers of unsupported silicone rubber tape which has been subjected to a preapplication cure that has progressed until the tape has the following two characteristics: (1) similarly curved external surfaces and (2) a stress strain curve of the tape at room temperature, persists at elevated temperatures with an upward slope from strain equals zero to strain equals 100 percent, but said cure has not progressed until the tape has acquired a characteristic (3) that the tape will rupture if stretched 100 percent at room temperature and heated at least to about 200° C., and the interstices between said layers being filled with uncured silicone rubber paste, said composite insulation being thoroughly cured at least until said cure progresses to the point at which said tape unwrapped acquires said characteristic (3).

12. An insulated coil for electric motors and generators and the like, comprising: a conductor, having both straight and curved portions and a homogeneous void-free ground wall insulation surrounding said conductor, said insulation being of unsupported tape of silicone rubber which has been subjected to a preapplication cure that has progressed until the tape has the following two characteristics: (1) similarly cured external surfaces and (2) a stress strain curve of the tape at room temperature, persists at elevated temperatures with an upward slope from strain equals zero to strain equals 100 percent, but said cure has not progressed until the tape has acquired a characteristic (3) that the tape will rupture if stretched 100 percent at room temperature and heated to at least 200° C., said tape being wrapped in layers around said conductor stretched between 10 to 50 percent on said straight portions and between 10 to 100 percent on said curved portions and subjected to a final cure prolonged at least until said cure progresses to the point at which said tape unwrapped acquires said characteristic (3).

13. An insulated coil for electric motors and generators, and the like, comprising: the conductor, and a homogeneous void-free ground wall insulation surrounding said conductor, said insulation being an unsupported tape of compounded elastomeric organopolysiloxane having from 1.9 to 2.0 organic radicals per silicon atom, at least 50 mol percent of the siloxane units being dimethylsiloxane units, the remainder of the units being of the formula RR'SiO, when R and R' are selected from the group of lower aliphatic hydrocarbon radicals and phenol radicals, said tape having been subjected to a preapplication cure that has progressed until the tape has the following two characteristics: (1) similarly cured external surfaces and (2) a stress strain curve of the tape at room temperatures, persists at elevated temperatures with an upward slope from strain equals zero to strain equals 100 percent, but said cure has not progressed until the tape will rupture if stretched 100 percent at room temperature and heated to 200° C.

References Cited in the file of this patent

UNITED STATES PATENTS

| | | |
|---|---|---|
| 2,675,421 | Dexter | Apr. 13, 1954 |
| 2,708,289 | Collings | May 17, 1955 |
| 2,736,721 | Dexter | Feb. 28, 1956 |
| 2,763,609 | Lewis | Sept. 18, 1956 |
| 2,789,155 | Marshall et al. | Aug. 16, 1957 |

FOREIGN PATENTS

| | | |
|---|---|---|
| 606,752 | Great Britain | Aug. 19, 1948 |